(12) United States Patent
Rosner et al.

(10) Patent No.: US 7,997,822 B2
(45) Date of Patent: Aug. 16, 2011

(54) SPREADABLE FOOD METERED DISPENSER SYSTEM

(75) Inventors: Ileen Rosner, Novelty, OH (US); Alexander Sterling Wise, Mentor, OH (US); Francis Kiss deVirag, Kirtland Hills, OH (US); Jonathan Rosner, Novelty, OH (US)

(73) Assignee: Innovative Consumer Solutions, LLC, Novelty, OH (US)

( * ) Notice: Subject to any disclaimer, the term of this patent is extended or adjusted under 35 U.S.C. 154(b) by 389 days.

(21) Appl. No.: 11/847,251

(22) Filed: Aug. 29, 2007

(65) Prior Publication Data

US 2008/0121658 A1   May 29, 2008

Related U.S. Application Data

(60) Provisional application No. 60/823,866, filed on Aug. 29, 2006.

(51) Int. Cl.
*B67D 5/38* (2006.01)

(52) U.S. Cl. ........ 401/263; 401/261; 401/194; 222/158; 222/386; 222/333

(58) Field of Classification Search ............. 222/1, 135, 222/137, 333, 390, 325–327, 391, 192, 93, 222/566; 401/175, 261, 265, 266, 277, 171, 401/172, 174, 176, 177, 179, 181, 182, 262, 401/263, 194; 426/115; 30/123.3, 141
See application file for complete search history.

(56) References Cited

U.S. PATENT DOCUMENTS

| | | | | |
|---|---|---|---|---|
| 1,484,618 A * | 2/1924 | Blades | ........................ | 452/131 |
| 2,656,600 A * | 10/1953 | Barbee | ........................ | 30/123.3 |
| 3,088,470 A * | 5/1963 | Hall | ............................ | 401/11 |
| 4,011,879 A * | 3/1977 | Roberts | ...................... | 132/227 |
| 4,888,188 A * | 12/1989 | Castner et al. | .............. | 426/109 |
| 5,052,593 A * | 10/1991 | Grome et al. | ................ | 222/333 |
| 5,894,959 A * | 4/1999 | Sigurlidason | ................ | 222/192 |
| 5,993,188 A * | 11/1999 | Mak | ........................ | 425/376.1 |
| 6,352,465 B1 * | 3/2002 | Heymann et al. | ............. | 446/473 |
| 6,460,481 B1 * | 10/2002 | Young | ........................... | 118/14 |
| 6,543,953 B1 * | 4/2003 | Kim | ............................ | 401/75 |
| 6,619,508 B2 * | 9/2003 | Balcome et al. | ............. | 222/136 |
| 6,701,828 B1 * | 3/2004 | Burns et al. | ................ | 99/450.2 |
| 6,957,747 B2 * | 10/2005 | Peeler et al. | ..................... | 222/1 |
| 7,210,600 B1 * | 5/2007 | Delio, Jr. | ....................... | 222/92 |
| 7,213,994 B2 * | 5/2007 | Phipps et al. | ................. | 401/175 |
| 2005/0025560 A1 * | 2/2005 | Liberatore | .................... | 401/266 |
| 2005/0178796 A1 * | 8/2005 | Shraiber | ........................ | 222/78 |
| 2008/0101850 A1 * | 5/2008 | Wojcik et al. | ................ | 401/265 |

* cited by examiner

*Primary Examiner* — Kevin P Shaver
*Assistant Examiner* — Donnell Long
(74) *Attorney, Agent, or Firm* — Turocy & Watson, LLP

(57) ABSTRACT

A dispensing system for spreadable foodstuffs and spreadable non-food substances allowing for dispensing of metered amounts of foodstuffs or non-food substances and spreading without the need for additional utensils not part of the packaging is disclosed. The system is composed of a disposable cartridge containing a spreadable product and a reusable dispenser that acts to dispense product from the disposable cartridge. The dispenser may rapidly switch between different disposable cartridges.

19 Claims, 2 Drawing Sheets

Fig 2
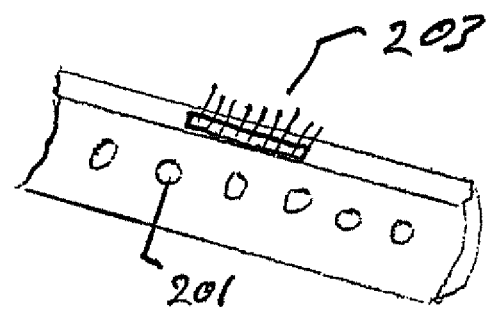
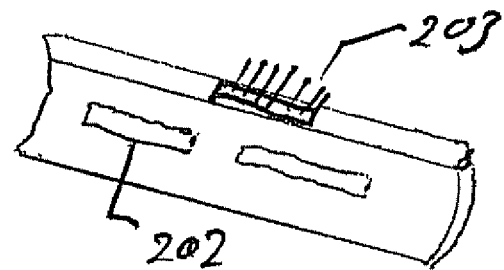

SPREADABLE FOOD METERED DISPENSER SYSTEM

TECHNICAL FIELD

The subject invention generally relates to a device for dispensing spreadable food products or other spreadable non-food substances. In particular, the subject invention relates to metering and dispensing spreadable products evenly from a container without the use of a knife or other utensils not part of the food packaging.

BACKGROUND

The vast majority of packaging of spreadable foodstuffs lack any functionality to allow contents to be used directly from the packaging. The packaging for spreadable foodstuffs such as ketchup, mustard, cream cheese, peanut putter, jelly, etc. typically require a knife or other utensil not part of the food packaging to remove the foodstuff from a container and/or achieve spreading the foodstuff as desired. Even containers that allow for squeezing the foodstuff contained therein directly out of the packaging often still require a utensil not part of the food packaging to evenly spread the foodstuff. Such containers also often do not dispense foodstuffs easily as the void space of the container increases as foodstuff is consumed. Often the contents may splatter or take a significant amount of time to flow due to a large volume of air in the container. Air being introduced to the container during the products use also negatively affects product freshness.

Additionally, spreadable foodstuffs are often difficult if not impossible to measure via traditional means such as measuring cups. Very viscous foodstuffs such as peanut butter and cream cheese are difficult to measure with measuring cups since an accurate measurement may only be achieved by packing the product to remove any air left in the measuring cup. Even after an accurate measure is taken, it is extremely difficult to quantitatively transfer the measured product out from the measuring cup.

The invention is also designed for use with a variety of non-food semi-solid or gelatinous substances. These substances include but are not limited to toothpaste, shoe polish, paints, cosmetics, thick oils, topical medications, and emollients. The typical containers for these substances are often the same and have the same limitations as those used for foodstuffs. These main limitations being the need for an additional utensils to remove and use the substance from the container, air being introduced to the containers over time as the substance is used, difficulty of use for children or individuals with physical limitations, and difficulty in measuring with measuring cups.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides for spreadable foodstuffs and non-food substances to be packaged in a container that has a means for metering foodstuffs or substance and spreading in a knife-like manner without the use of any additional utensils as well as providing for a packaging of adjustable volume such that product is kept away from air during use. A solution to accurate measurement and use of spreadable foodstuffs is provided which is especially in restaurant settings where consistency is important. An accurate way to dispense spreadable foodstuffs is also provided for in home-settings for portion control and dieters. There are also many applications for the invention with non-food substances such as accurately applying a predetermined amount of polish or topical medication.

One aspect of the invention relates to providing a convenient means of use of spreadable foodstuffs and non-food substances in residences without the need for utensils. An additional aspect of the invention relates to providing a convenient and easy to use means for spreading foodstuffs and substances for elderly, disabled, children, and physically challenged persons. Another aspect of the invention relates to providing a convenient means of use of spreadable foodstuffs or non-food substances for those traveling, picnics or other outdoor activities, or other times when traditional home amenities are not available.

Yet another aspect of the invention relates to providing a means for restaurants and caterers to dispense and use spreadable foodstuffs with greater speed.

Still yet another aspect of the invention relates to providing a packaging for spreadable foodstuffs and non-food substances that keeps contents fresher once seal on package has been broken. Another aspect of the invention relates to minimizing food waste compared to traditional food packaging.

An additional aspect of the invention is to provide a packaging that is less disposable than traditional packaging and therefore suitable for targeted and affinity marketing in a more affective manner. An additional aspect of the invention is to make measuring spreadable foodstuffs and non-food substances more convenient.

Still yet another aspect of the invention is to provide for an automated means of dispensing foodstuffs and non-food substances that may easily and rapidly switch between dispensing different foodstuffs. An additional aspect of the invention is to provide an automated means of dispensing foodstuffs and non-food substances that is ergonomical.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 2 is a view of the knife-like applicator.

DETAILED DESCRIPTION

Figure 1:
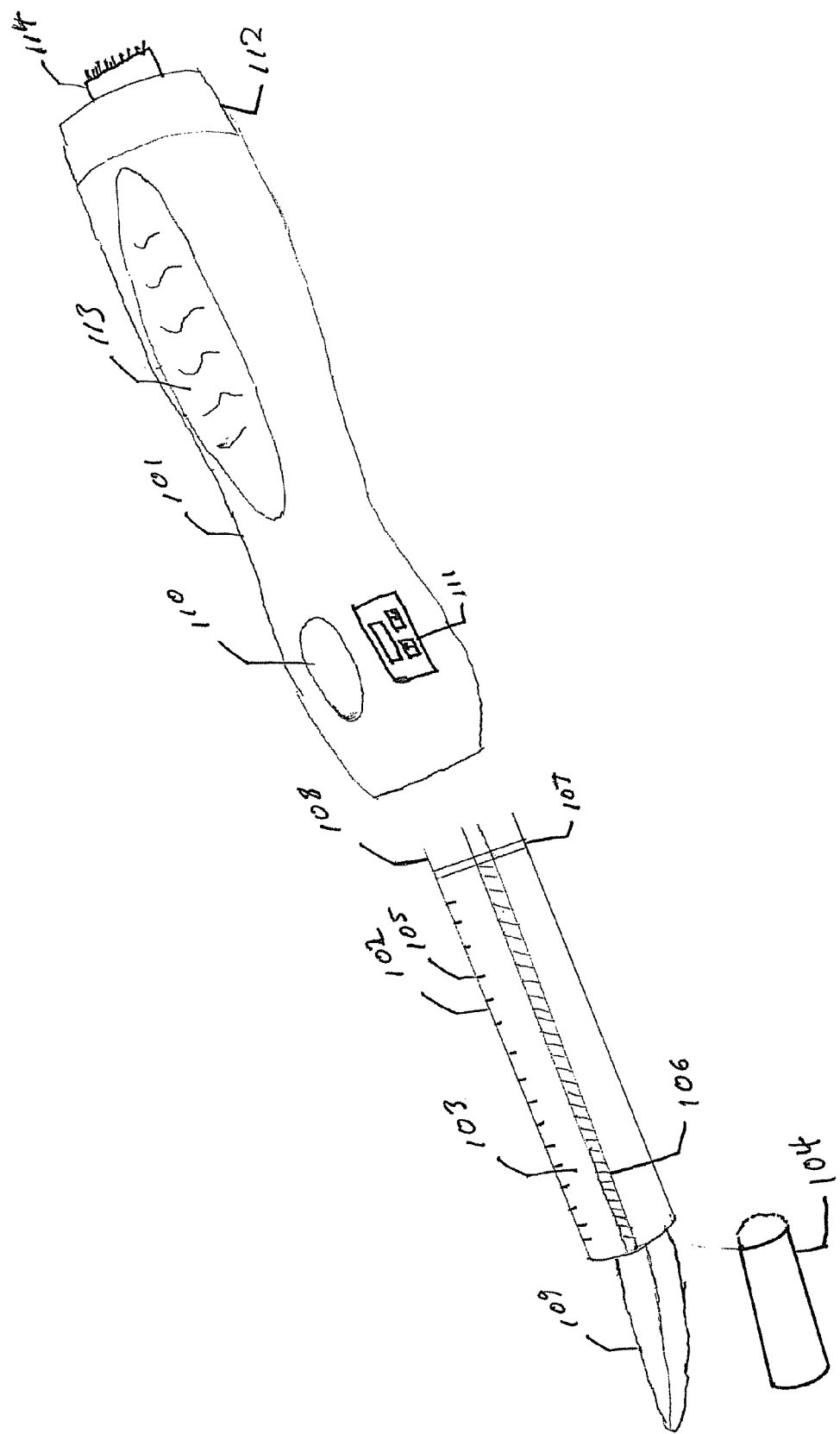
FIG. 1 is a view of the first embodiment of the invention comprising a disposable cartridge and dispensing handle drawn detached from each other.

The food packaging is comprised of a substantially cylindrically shaped dispenser which is ergonomically designed to fit comfortably in the human hand. The dispenser has an extended useful lifetime and can be used to dispense several different kinds of substances and products. The products are supplied as a replacement cartridge product (RCP). The RCP is a cylindrical tube composed of rigid or semi-rigid food-grade or chemical resistant plastic as required by the application. One end of the RCP has a coupling mechanism allowing the RCP to reversibly attach to the dispenser. The other end of the RCP has an applicator portion that has a knife-like shape and is permanently molded to the rest of the RCP. The knife-like applicator has a triangular shape. One edge of the applicator has a series of holes or openings through which foodstuffs pass upon dispensing. In this manner, products may be dispensed directly to the location of their desired use and immediately spread without the use of any other utensils besides the dispenser and the RCP, which form one complete unit during use. In an alternate fashion, dispensing of product may load the knife-like applicator with a desired amount of product which may then be spread where desired.

The mechanical operation of the dispensing system is as follows. The RCP contains a screw-spindle running along the longitudinal axis of the RCP. The end of the RCP that attaches to the dispenser is formed of a plunger member that is attached to said screw spindle. The plunger member forms a tight seal with the body of the RCP but still capable of sliding along the body of the RCP. When the RCP is attached to the dispenser, the screw spindle fits into a receptacle on the coupling end of the dispenser. A mechanism inside the dispenser turns the screw-spindle which in turn moves the plunger member along the body of the RCP. Movement of the plunger member expels foodstuff or non-food substance through the opening on the applicator. The mechanism inside the dispenser may either be powered manually by the user or by an electric motor. The RCP is designed to be disposable upon use of most or all the foodstuff or non-food substance contained inside.

In one embodiment of the invention, the RCP is made out of transparent or semitransparent material such that the plunger member is visible through the body of the RCP. Units of weight or volume or weight are marked on the body of the RCP. Upon dispensing of the foodstuff or non-food substance, the movement of the plunger member is observed by the user such that the amount of foodstuff dispensed is known. In a second embodiment of the invention, the dispenser is manufactured such that activation of the dispensing mechanism inside the dispenser causes a known rotation of the screw-spindle in the RCP, and therefore, a know volume of foodstuff is dispensed. In a third embodiment of the invention, a CPU and ROM are coupled with an electric motor inside the dispenser. The amount of foodstuff desired to be dispensed is entered through an LCD located on the body of the dispenser. The CPU and ROM are preprogrammed with the turn of screw axis/product dispensed ratio such that an exact amount of product is accurately dispensed.

One embodiment of the dispenser of the invention is depicted in FIG. 1. The body of the dispenser 101 is composed of rigid food grade or chemical resistant material depending on the application. Similarly, the body of the RCP 102 is composed of rigid or semi-rigid food grade or chemical resistant material. The RCP comprises mostly a hollow space 103 which contains the spreadable foodstuffs on non-food substance. The contents are kept fresh by a lid 104 before the RCP is placed in use. The lid 104 can be replaced such that the RCP can be detached from the dispenser before the contents are completely consumed. Optionally, the body of the RCP 102 is made from transparent or semi-transparent material and graduations are placed on the RCP 105. There is a screw-spindle 106 running along the longitudinal axis of the RCP. There is a plunger member 107 located at one end of the RCP and a lip 108 surrounding that end of the RCP. The plunger member 107 and lip 108 are designed in a manner that a part of the dispenser may extent past the lip and engage the screw-spindle 106. A tube may optionally be placed along the longitudinal axis of the RCP such that the screw-spindle 106 is kept out of contact with the product contained in the hollow space 103. If need be, the foodstuffs or non-food substances can be manually squeezed out of the RCP when the RCP is constructed out of semi-rigid material. The RCP can be designed to attach to the dispenser through a latch and spring mechanism or a twist and lock mechanism, which are both extremely common in the art.

The dispensing end of the RCP 109 is in one piece with the RCP 102 and is shaped in a triangular knife-like shape. Several views of the applicator region are shown in FIG. 2. The number and diameter of the openings is selected based on the consistency or viscosity of the product. For example, a larger number of smaller holes 201 are useful for less viscose products such as jelly, ketchup or emollients. One or two large holes 202 are appropriate for very viscose products such as peanut butter, cream cheese or shoe polish. The flat surface of the applicator is used in a knife-like fashion to spread the products as desired. Also, depending of the viscosity of the foodstuffs or nonfood substances, the foodstuffs may be dispensed completely onto a surface and then spread. For some high viscosity foodstuffs or non-food substances, dispensing of such foodstuff may preload the knife-like applicator with product that may then be spread onto a desired location.

The dispenser may optionally have one or more rubber grips 110 on the body of the dispenser 101. In one embodiment of the dispenser of the invention, the screw-spindle 106 is rotated manually upon depressing a button 110 located on the surface of the RCP. Alternatively, the button 110 may be replaced with a rotating wheel to allow for more rapid dispensing of foodstuff depending on the application desired. Methods for coupling the mechanical depression of a button/rotating wheel to rotation of a gear and/or screw spindle are well known in the art. Each depression of the button 110 results in a known rotation of the screw-spindle 106 and therefore a known amount of foodstuff is dispensed. When a rotating wheel is employed, such wheel is demarked with graduations giving the user the ability to know how much foodstuff is to being dispensed. In a second embodiment of the dispenser of the invention, the screw-spindle 106 is rotated via an electric motor and battery located within the dispenser. The motor is activated upon depression of button 110. The electric motor is coupled with a CPU and ROM programmed with the volume turn of screw-spindle/volume dispensed ratio. A specific volume to be dispensed is entered using an LCD screen 111 located on the dispenser to program the CPU and ROM. The battery may be rechargeable from a DC power source for high use applications such as restaurants. In every embodiment, the dispenser has a manual override consisting of a rotating wheel 112 located on the end of the dispenser. One or more rubber grips may optionally be placed on the dispenser 113. Additionally, certain applications, such as shoe polish or paints, may benefit from built-in bristles or brushes on the container. Such bristles or brushes may be built into the dispensing unit 114, the knife-like applicator or the RCP 203, or any other convenient location on the packaging.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A dispensing system comprising:
    a replaceable container having spreadable foodstuffs or non-food substances contained therein, the container having a first end comprising a plunger member and a coupling mechanism configured to reversibly attach to a dispenser and a second end comprising an applicator permanently molded thereto, the applicator having an elongated flat surface that is capable of spreading the spreadable foodstuffs or non-food substances in a knife-like manner and the applicator having at least one opening on the flat surface;
    the dispenser configured to move the plunger member along a longitudinal axis of the container, wherein movement of the plunger member along the longitudinal axis of the container dispenses the foodstuff or the non-food substance from the container through the at least one opening of the applicator, movement of the plunger dispensing a known volume of foodstuff or non-food substance; and
    wherein a user can determine a metered quantity of foodstuff or non-food substance to dispense.

2. The dispensing system of claim 1 wherein the dispenser receives manual power input.

3. The dispensing system of claim 1 wherein the dispenser is powered by an electric motor.

4. The dispensing system of claim 3 wherein the dispenser further comprises a microprocessor to control the electric motor.

5. The dispensing system of claim 1, wherein the container further comprises a screw-spindle arranged along the longitudinal axis of the container, and wherein the plunger member is attached to the screw spindle.

6. The dispensing system of claim 5 wherein the screw-spindle is configured to fit into a receptacle on the dispenser when the first end of the container is attached to the dispenser.

7. The dispensing system of claim 6 wherein the dispenser functions to rotate the screw-spindle when the screw-spindle is fitted within the receptacle of the dispenser, and wherein rotation of the screw-spindle results in the movement of the plunger member along the longitudinal axis of the container.

8. The dispensing system of claim 1, wherein the applicator is capable of holding a foodstuff on non-food substance on the flat surface.

9. The dispensing system of claim 1 wherein the knife-like applicator has a triangular shape.

10. The dispensing system of claim 1 further comprising a removable and re-usable lid configured to seal the at least one opening of the applicator.

11. The dispensing system of claim 1 wherein the number and diameter of the at least one opening is a function of the consistency or viscosity of the foodstuff or non-food substance.

12. The dispensing system of claim 7 wherein a known rotation of the screw-spindle results in the movement of the plunger member along the longitudinal axis of the container to dispense the known volume of foodstuff or non-food substance.

13. The dispensing system of claim 1 further comprising rubber grips on the dispenser.

14. A dispensing system comprising:
    a replaceable container having spreadable foodstuffs or non-food substances contained therein, the container having a first end comprising a screw-spindle, a plunger member and a coupling mechanism configured to reversibly attach to a dispenser and a second end comprising an applicator permanently molded thereto, the applicator having an elongated flat surface that is capable of spreading the spreadable foodstuffs or non-food substances in a knife-like manner and the applicator having at least one opening on the flat surface;
    the dispenser configured to move the plunger member along a longitudinal axis of the container, wherein movement of the plunger member along the longitudinal axis of the container dispenses the foodstuff or the non-food substance from the container through the at least one opening of the applicator, movement of the plunger dispensing a known volume of foodstuff or non-food substance;
    the dispenser comprising an electric motor for moving the plunger; and
    wherein a user can determine a metered quantity of foodstuff or non-food substance to dispense.

15. The dispensing system of claim 14 further comprising rubber grips on the dispenser.

16. The dispensing system of claim 14 wherein a known rotation of the screw-spindle results in the movement of the plunger member along the longitudinal axis of the container to dispense the known volume of foodstuff or non-food substance.

17. A dispensing system comprising:
    a replaceable container having spreadable foodstuffs or non-food substances contained therein, the container having a first end comprising a screw-spindle, plunger member and a coupling mechanism configured to reversibly attach to a dispenser and a second end comprising an applicator permanently molded thereto, the applicator having an elongated flat surface that is capable of spreading the spreadable foodstuffs or non-food substances in a knife-like manner and the applicator having at least one opening on the flat surface;
    the dispenser configured to move the plunger member along a longitudinal axis of the container, wherein movement of the plunger member along the longitudinal axis of the container dispenses the foodstuff or the non-food substance from the container through the at least one opening of the applicator, movement of the plunger dispensing a known volume of foodstuff or non-food substance;
    the dispenser comprising an electric motor for moving the plunger, the electric motor coupled with a central processing unit and read only memory programmed with a volume turn of the screw-spindle; and
    wherein a user can determine a metered quantity of foodstuff or non-food substance to dispense.

18. The dispensing system of claim 14 further comprising rubber grips on the dispenser.

19. The dispensing system of claim 14 wherein a known rotation of the screw-spindle results in the movement of the plunger member along the longitudinal axis of the container to dispense the known volume of foodstuff or non-food substance.

* * * * *